Sept. 3, 1940.　　　J. HOSCHEK　　　2,213,781
SIGNALING DEVICE FOR ANNOUNCING PRESSURE LOSS IN PNEUMATIC TIRES
Filed May 14, 1939
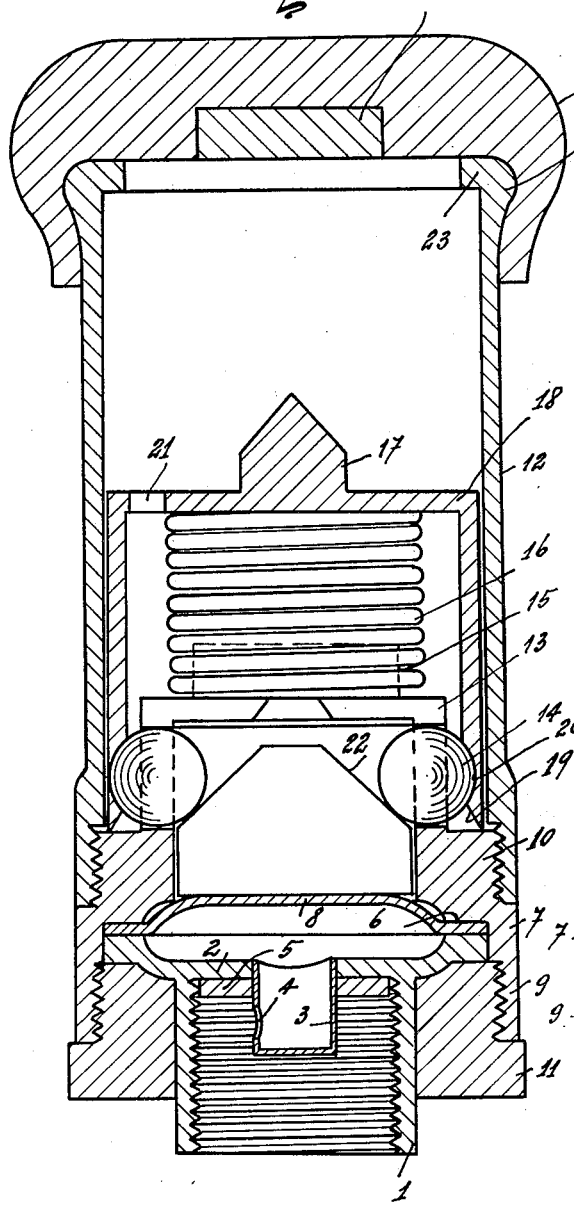
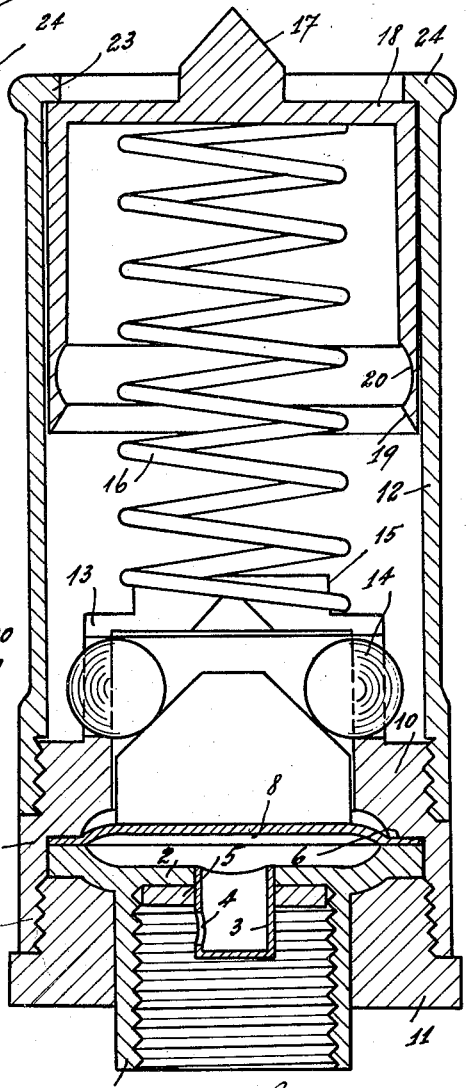
Inventor:
Jose Hoschek
By E. F. Wendroth
Atty Patented Sept. 3, 1940

2,213,781

UNITED STATES PATENT OFFICE 2,213,781

SIGNALING DEVICE FOR ANNOUNCING PRESSURE LOSS IN PNEUMATIC TIRES

José Hoschek, Buenos Aires, Argentina

Application May 14, 1938, Serial No. 208,068
In Argentina April 8, 1938

2 Claims. (Cl. 116—34)

The present invention relates to a new signaling device for announcing pressure loss in pneumatic tires of all kinds of vehicles equipped therewith, and its principal object consists in providing an apparatus which for the purpose referred to, as soon as the pressure of a pneumatic tire decreases beyond a predetermined limit, provokes the explosion of a harmless quantity of gun powder, and thus produces a detonation loud enough to be heard by the driver of the vehicle.

The apparatus according to the invention is advantageously distinguished from the known pressure loss indicating devices, not only by its simple construction and its low cost, but also by its easy application and by the fact that no special nor additional means have to be provided for in the different classes of vehicles to which said apparatus is to be applied.

An important advantage of the signaling device according to the invention resides in that the same is adapted to be applied to the usual valve of the pneumatic tires, and as these valves in general are of standard size, said device may be manufactured of equal size for all the different types of vehicles.

It is true, there are pneumatic tires of different capacities, resisting different pressures, but also in as far as this condition is concerned, the apparatus according to this invention permits its construction in such a way that it responds to the desired pressure, making it also possible to supply apparatus responding to a given pressure, in which case, of course, it is necessary to manufacture apparatus of different pressure resisting capacities according to the different standard pressures of the pneumatic tires at present in use.

The signaling device for announcing pressure loss in pneumatic tires of all kinds of vehicles, according to the present invention, is adapted to be applied to the usual valve of the pneumatic tires in such a way that it constitutes a removable extension of said valve, the arrangement being such that it is said device after its application, and not the usual valve, which closes the air chamber of the pneumatic tire and which maintains the same closed even after its operation in the case that the pressure of the tire decreased beyond a predetermined limit.

The signaling device for announcing pressure loss in pneumatic tires, according to this invention, comprises screw threaded means permitting its easy application to the usual valve of a pneumatic tire, means for establishing communication between the air chamber of the pneumatic tire and the proper signaling device through the usual tire valve, means for maintaining said air chamber closed in spite of said communication, in co-operation with means responsive to the pressure in the air chamber of the pneumatic tire, and means for provoking the explosion of an inoffensive quantity of gun powder in the moment in which said pressure responsive means permit its operation, said device having a tubular casing adapted to receive a removable cover provided with a small cavity for said inoffensive quantity of gun powder, the explosion of which produces a detonation loud enough for being heard by the driver of the vehicle having the pneumatic tires provided with the signaling device of the invention.

With these objects in view and others which will become evident from the following description of the invention as illustrated on the accompanying drawing showing, by way of examples only, three different embodiments of the invention.

On said drawing:

Figure 1 is a longitudinal section of the signaling device according to the invention with the component parts thereof in position prior to a signaling operation, whereas Figure 2 is a longitudinal section of the same device with the component parts thereof in position after a signaling operation.

The signaling device for announcing pressure loss in pneumatic tires of all kinds of vehicles, comprises a tubular internally screw threaded member 1 adapted to be screwed upon the usual valve (not shown) of a pneumatic tire, said member being provided at its upper end with a centrally perforated plate 2. Into the perforation of this plate there is secured a small tube 3 having its lower end closed, but being provided with a lateral hole 4. Within the tubular member 1 around the tube 3 a packing ring 5 is conveniently provided in order to secure an air-tight connection between the valve of the pneumatic tire and the signaling device of the invention.

The outer edge of the plate 2 with its annular upper surface abuts against a shoulder 6 of a connecting ring 7. Between the abutting surfaces of the edge of the plate 2 and of the shoulder 6 a rubber or like flexible disk 8 is secured, which after the application of the tubular member 1 to the valve of a pneumatic tire, whereby the lower end of the tube 3 depresses the stem of said valve and opens the latter, hermetically closes the air chamber of the pneumatic tire, while said valve remains open.

The connecting ring 7 comprises an internally screw threaded annular extension 9 and an externally screw threaded portion 10, and the same serves for establishing the connection between the externally screw threaded ring member 11 and the tubular casing 12 of the signaling device according to the invention, whereby this casing is detachably connected with the tubular member 1 which in turn is secured to the valve of the pneumatic tire.

The connecting ring 7 comprises as integral part thereof a hat like member 13 provided with two or more holes with a ball 14 in each of said holes, and having on its top a central projection 15 for centering a coil spring 16 adapted to operate the firing mechanism of the signaling device according to the invention.

The firing mechanism comprises a pin 17 mounted on the top of a tubular member 18, which at its lower end 19 is provided with a bevel edge and with an annular groove 20, whereas the top of said member 18 has one or more holes 21 for the purpose of permitting the circulation of air within the tubular casing 12 and said tubular member 18.

The arrangement of the annular groove 20 is such that the balls 14 extend laterally into the same under the pressure exerted upon the same by a conical member 22 which is movably disposed within the externally screw threaded portion 10 of the connecting ring 7 and rests upon the disk 8, so that the pressure of the air of the pneumatic tire exerted upon said disk 8 is imparted to said conical member 22.

The cylindrical or tubular casing 12 at its upper end is provided with an inwardly projecting flange 23 for limiting the upward stroke of the firing mechanism 17, 18 when this is operated by the coil spring 16. The upper end of the casing 12 further comprises an outwardly extending rim 24 for retaining the cover or cap 25 of rubber or like flexible material provided on its inner side with a central cavity filled with gun powder 26.

The cover or cap 25 of rubber or like flexible material is advantageous because the same may be readily attached by hand, whereas its contracting force is sufficient to retain it on the rim 24 against the stroke of the firing pin 17; the same, however, will not resist the force of explosion of the gun powder 26 and will be fired, yet without causing any harm as it would likely be the case when using a metal cover or cap. Further, the rubber cover or cap 25, as compared with the usual cartridge is additionally advantageous for the reason that it does not require a special clamping device or other mechanical means for securing the same in its proper position. The rubber cap 25, finally, permits enclosing the gun powder and thus protecting the same against moisture.

The operation of this signaling device for announcing the loss of pressure in pneumatic tires is as follows:

When screwing the signaling device with its tubular member 1 upon the usual valve of a pneumatic tire, the lower end of the small tube 3 depresses the stem of the valve and opens the same, so that the air chamber of the pneumatic tire is put in direct communication with the space formed between the plate 2 and the disk 8 and that the pressure exerted by the air of the pneumatic tire directly acts upon said disk 8 and by the intermediation of the latter upon the conical member 22 forcing it upwardly against the balls 14, which for entering into the annular groove 20 of the tubular member 18, retain the latter against the pressure of the coil spring 16 in the position illustrated in Figure 1.

The coil spring 16 has to be selected so that the pressure exerted thereby is lower than the air pressure of the pneumatic tire in properly inflated condition, so that while this condition is maintained, said air pressure is sufficient to hold the conical member 22 in its position shown in Figure 1 and to retain by means of the balls 14 and the annular groove 20 the firing mechanism 17, 18 against the pressure of the coil spring 16.

As soon as the air pressure of the pneumatic tire decreases beyond a certain limit at which it cannot resist the pressure of the coil spring 16, the latter forces the firing mechanism 17, 18 upwardly so that the firing pin 17 provokes the explosion of the gun powder 26 in the cover or cap 25, under simultaneous destruction of the latter, and thus produces the desired detonation.

It will be readily understood that the spring 16 may effect this operation, because for decreasing the pressure upon the disk 8 and through this upon the conical member 22, the latter under the pressure exerted by said spring through the intermediate of the balls 14 moves downwardly permitting said balls to move inwardly to the position shown in the Figure 2 and to cease retaining the tubular member 18 in its annular groove 20. The movement of the firing mechanism 17, 18 would be counter-acted by the air in the cylindrical casing 12, or would cause the removal of the cover or cap 25 before the firing pin 17 reaches the gun powder 26, and in order to avoid this, the holes 21 are provided in the top of the tubular member 18 permitting the air to pass into the latter.

It has to be understood that the present invention by no means is limited to the embodiment as hereinbefore described and as shown on the accompanying drawing, but that amendments may be made therein as to the form, construction and arrangement of the component parts of the signaling device falling within the scope of the following claims.

Having thus particularly described the nature of my present invention and the manner how to carry the same into practice, what I claim and desire to secure by Letters Patent is:

I claim:

1. A signaling device for announcing pressure loss in pneumatic tires by means of a firing device responding to a predetermined pressure loss and exploding a harmless quantity of gun powder, comprising a composite cylindrical body, the upper portion of said cylindrical body forming a casing for said firing device, a gun powder containing cover or cap of flexible rubber material, said cover or cap being removably retained by a rim outwardly extending from the upper portion of said cylindrical body, the intermediate portion of said composite cylindrical body comprising a screw threaded inwardly projecting annular member and a ball cage formed as an integral part of the latter for retaining the firing device in its inoperative position, the lower portion of said composite cylindrical body being formed by an externally screw threaded ring, a tubular internally screw threaded element surrounded and fixed in place by said ring and adapted for being screwed upon the tire valve, said internally screw threaded element formed with a plate like, centrally perforated disk and with a downwardly projecting hollow stem in its central perforation for opening the tire valve, a sealed chamber formed on said disk by a flexible diaphragm fixed in place by being clamped between the outer upper edge of said disk and the lower surface of a shoulder formed by the aforementioned inwardly projecting annular member, and a truncated element movably disposed on said diaphragm within said annular member in pressing contact with the balls of said ball cage for retaining the same in engagement with an annular groove of the tubular spring loaded firing device as long as the pressure exerted by the air of the pneumatic tire on said diaphragm does not decrease beyond a predetermined limit.

2. A signaling device for announcing pressure loss in pneumatic tires by means of a firing device responding to a predetermined pressure loss and exploding a harmless quantity of gun powder, comprising a composite cylindrical body, the upper portion of said cylindrical body forming a casing for said firing device, a gun powder containing cover or cap of flexible rubber material, said cover or cap being removably retained by a rim outwardly extending from the upper portion of said cylindrical body, a flange projecting inwardly from said cylindrical body for limiting the stroke of said firing device, the intermediate portion of said composite cylindrical body comprising an inwardly projecting annular member provided with an externally screw threaded upper portion and with an internally screw threaded lower portion and with a ball cage formed as an integral part of said annular member for retaining the firing device in its inoperative position, the lower portion of said composite cylindrical body being formed by an externally screw threaded ring, the three portions of said body thus being adapted for being readily screwed together, a tubular, internally screw threaded element surrounded and fixed in place by said ring and adapted for being screwed upon the tire valve; said internally screw threaded element formed with a plate like centrally perforated disk and with a downwardly projecting hollow stem in its central perforation for opening the tire valve, a sealed chamber formed on said disk by a flexible diaphragm fixed in place by being clamped between the outer upper edge of said disk and the lower surface of a shoulder formed by the aforementioned inwardly projecting annular member, and a truncated element movably disposed on said diaphragm within said annular member in pressing contact with the balls of said ball cage for retaining the same in engagement with an annular groove of the tubular spring loaded firing device as long as the pressure exerted by the air of the pneumatic tire on said diaphragm does not decrease beyond a predetermined limit.

JOSÉ HOSCHEK.